(12) United States Patent
Higuchi (10) Patent No.: US 7,633,715 B2
(45) Date of Patent: Dec. 15, 2009

(54) MAGNETIC HEAD FOR USE IN A HEAT-ASSISTED MAGNETIC RECORDING APPARATUS

(75) Inventor: Takanobu Higuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 530 days.

(21) Appl. No.: 11/325,603

(22) Filed: Jan. 5, 2006

(65) Prior Publication Data
US 2006/0181798 A1 Aug. 17, 2006

(30) Foreign Application Priority Data
Jan. 6, 2005 (JP) ............................... 2005-001226

(51) Int. Cl.
*G11B 5/127* (2006.01)
(52) U.S. Cl. .................. 360/125.74; 977/943; 977/939; 977/742
(58) Field of Classification Search .................. 977/742, 977/744, 743, 393, 943; 360/124.74, 125.31
See application file for complete search history.

(56) References Cited

U.S. PATENT DOCUMENTS

| | | | | |
|---|---|---|---|---|
| 6,735,046 B2* | 5/2004 | Nakayama et al. | .......... | 360/110 |
| 6,878,444 B2* | 4/2005 | Suzuki et al. | ............... | 428/375 |
| 6,885,010 B1* | 4/2005 | Traynor et al. | .............. | 250/427 |
| 7,170,714 B2* | 1/2007 | Coffey et al. | ............... | 360/128 |
| 2001/0006435 A1* | 7/2001 | Ichihara et al. | ............... | 360/55 |

FOREIGN PATENT DOCUMENTS

| JP | 2001-189002 | 7/2001 |
|---|---|---|
| JP | 2001-250201 | 9/2001 |

* cited by examiner

Primary Examiner—Julie Anne Watko
(74) Attorney, Agent, or Firm—Drinker Biddle & Reath LLP (57) ABSTRACT

A magnetic head for use in a magnetic recording apparatus for magnetically recording information in a state of heating and elevating the temperature of a recording portion of a recording medium by emitting electrons to the recording medium, the magnetic head including a recording magnetic pole having a magnetic surface opposed to the recording medium, and supplying a magnetic flux to the recording medium and an electron emitting source formed in the recording magnetic pole. The electron emitting source has a concave portion having an opening formed in the recording magnetic pole and open to the recording magnetic pole surface and a bundle of a plurality of carbon nanotubes each extending from the bottom to the opening of the concave portion.

7 Claims, 6 Drawing Sheets

FIG. 1

MOVING DIRECTION OF
RECORDING MEDIUM

FIG. 2

MOVING DIRECTION OF RECORDING MEDIUM

MOVING DIRECTION OF RECORDING MEDIUM →

MAGNETIC HEAD FOR USE IN A HEAT-ASSISTED MAGNETIC RECORDING APPARATUS

BACKGROUND OF THE INVENTION

1. Field of the Invention

The present invention relates to a magnetic head for use in magnetic recording apparatus. More particularly, the present invention relates to a magnetic head for use in a heat-assisted magnetic recording apparatus of magnetically recording information in a state of heating and elevating the temperature of a recording portion of a recording medium by emitting electrons to the recording medium.

2. Description of the Related Art

Magnetic heads for use in the heat-assisted magnetic recording apparatus include those as described in JP-A Nos. 2001-250201 (Patent document D1) and 2001-189002 (Patent document D2).

As the constitutional examples of heat-assisted magnetic recording apparatus, the Patent document D1 discloses an example of providing an electron beam emitting source (emitter cone) near the side of a leading edge from a recording magnetic pole and another example of emitting electrons by roughening the surface of a recording magnetic pole or providing at least one protrusion on the surface of the recording magnetic pole. As the example of the heat-assisted magnetic recording apparatus for recording magnetic information in a state of heating and elevating the temperature of a magnetic recording medium by using a heat source of an optical beam or an electron beam, the Patent document D2 discloses an example of providing a semiconductor light emitting source or an emitter cone on the side of the leading edge of a recording magnetic pole. According to the magnetic recording apparatus, recording can be conducted by elevating the temperature of a magnetic body by electron beams to a curie point or higher and forming magnetic domains by an external magnetic field in the course of cooling.

The patent Documents described above disclose examples of the constitution of providing the emitter cone on the side of the leading edge of the recording magnetic pole. However, in a case of intending to form the emitter cone by the method disclosed in the Patent document D1, it is described as: "it is preferred to define the length of the hole in the direction of the recording track width to about Tw+2 nHe and the length of the hole in the direction of the recording track to about 2 nHe in order to obtain a sharp top end shape causing effective electric field emission assuming, for example the recording track width as Tw and the height of the electron emission source to be prepared as He" (column [0080]). Accordingly, the end face of the leading edge of the recording magnetic pole is spaced from the top end of the emitter cone at least by the distance for the height of the emitter cone. In a specific example of the Patent document D1, the height of the emitter cone is 250 nm (column [0081]). Accordingly, in the constitutional example of Patent document D1, an electron beam irradiation position (that is, temperature increase position) and an application position for recording magnetic line of force on the recording medium are displaced greatly. Further, in a case of intending to provide a plurality of emitter cones in the direction of the recording track, the amount of positional displacement is further increased. In addition, the emitter cone has to be formed by way of complicate steps such as a resist burying step, a thin film forming step, a step of forming a cone-forming hole on a resist, a vapor deposition or sputtering step of an emitter cone material, and a resist removing step. Complicate manufacturing steps lowers the yield and increases the cost, which is not preferred.

On the other hand, in a case of adopting another constitutional example disclosed in the Patent document D1, that is, an example of roughening the surface of the recording magnetic pole or an example of emitting electrons by providing at least one protrusion on the surface of the recording magnetic pole, while the position for electron beam irradiation (that is, position for temperature increase) and a position of applying magnetic line of force for recording on a recording medium can be aligned with each other, since an unevenness is inevitably formed on the surface of the magnetic head in this constitutional example, this may possibly cause occurrence of head crush in a case where the flying height of the magnetic head is in a region from 10 to 20 nm. Further, in a case of roughening the surface of the recording magnetic pole, it is difficult to control the position at the surface of the recording magnetic pole for emitting the electron beams.

In other prior art than the constitutional example of roughening the surface of the recording magnetic pole or the constitutional example of emitting electrons by providing at least one protrusion on the surface of the recording magnetic pole, since magnetic fields leaked from recording bits present on a recording medium or magnetic fields leaked from the recording magnetic pole have a component not in parallel but crossing the flow of electron beams, in a case of not providing a constitution of accelerating electrons to an electron beam emitting device, the electron beams undergo the external force due to magnetic fields to fluctuate the relative positional ratio between the position for electron beam irradiation (that is, position for temperature increase) on the recording medium and the application position of magnetic line of force for recording. Since this means that the position of the recording bits determined by the distribution of the temperature increasing region fluctuates, this causes fluctuation of reading signals on the time axis (jitter) or meandering of the recording track.

SUMMARY OF THE INVENTION

It is an exemplary object of the present invention to provide a magnetic head for use in magnetic recording apparatus with less fluctuation of electron beam emission.

A magnetic head for use in magnetic recording apparatus in accordance with the invention is a magnetic head of magnetically recording information in a state of heating and elevating the temperature of a recording portion of a recording medium by emitting electrons to the recording medium, the head including a recording magnetic pole having a recording magnetic pole surface opposed to the recording medium and supplying a magnetic flux to the recording medium, and an electron emitting source formed to the recording magnetic pole, in which the electron emitting source has a concave portion having an opening formed to the recording magnetic pole and open to the surface of the recording magnetic pole and a bundle of a plurality of carbon nanotubes each extending from the bottom of the concave portion to the opening.

BRIEF DESCRIPTION OF THE DRAWINGS

The aforementioned aspects and other features of the invention are explained in the following description, taken in connection with the accompanying drawing figures wherein.

DETAILED DESCRIPTION OF THE INVENTION

Embodiments of the present invention are to be described with reference to the drawings.

Figure 1:
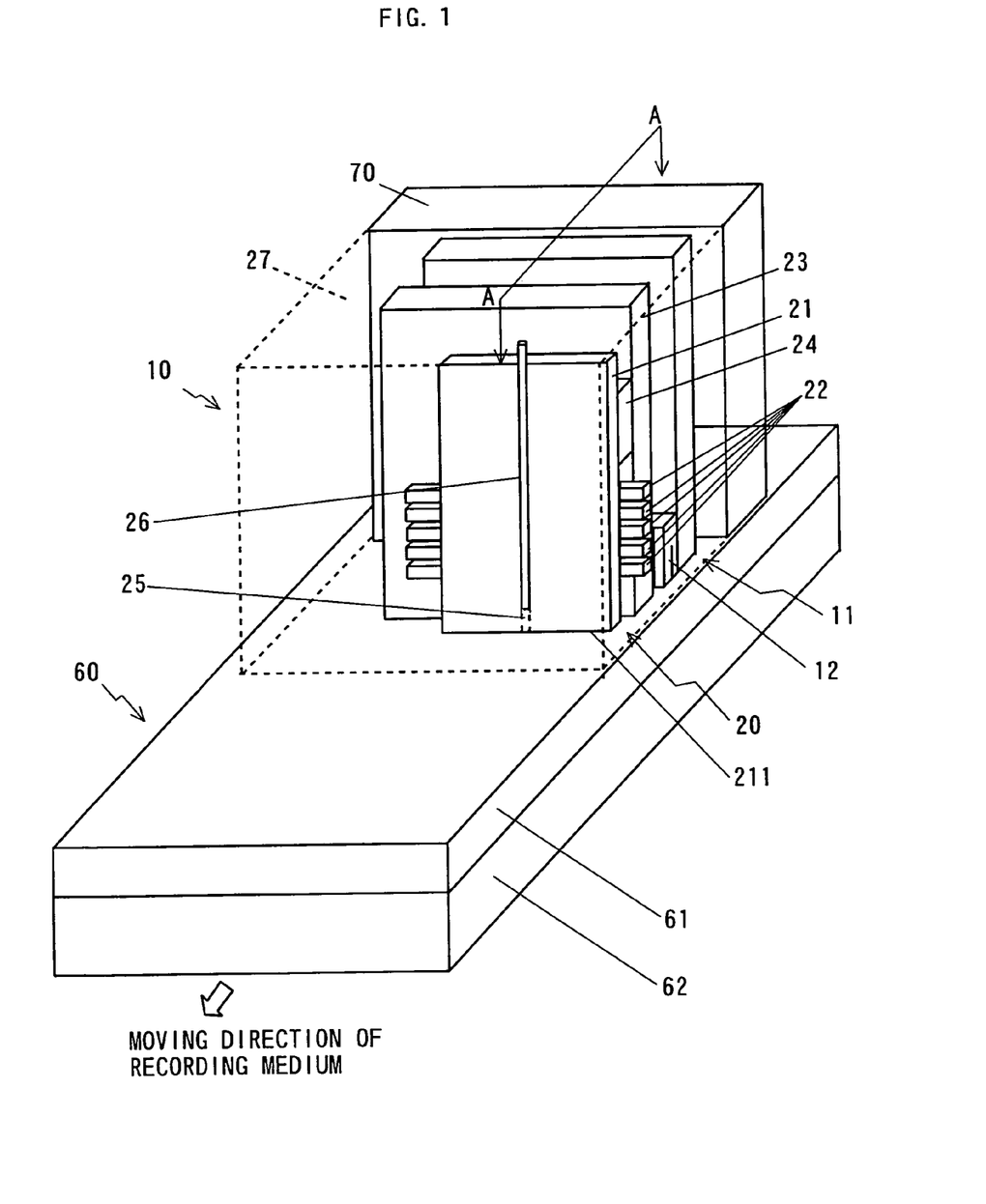
FIG. 1 is a perspective view showing a schematic constitution of a magnetic head for use in heat-assisted magnetic recording apparatus as an embodiment of the invention.
Figure 2:
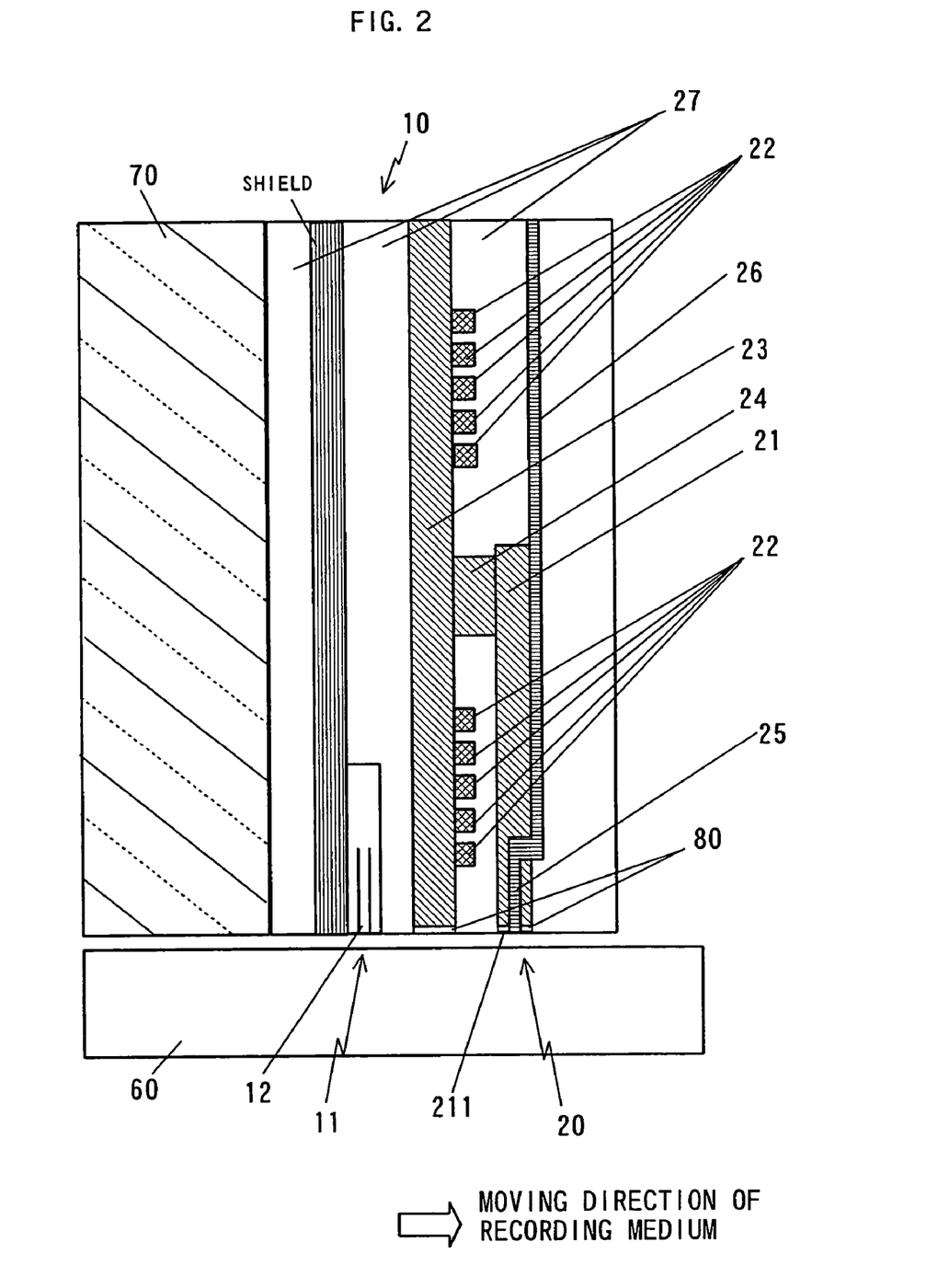
FIG. 2 is a cross sectional view taken along line A-A in FIG. 1.

FIG. 1 is a perspective view showing the schematic constitution of a magnetic head 10 for use in heat-assisted magnetic recording apparatus of this embodiment. FIG. 2 is a cross sectional view taken along line A-A in the direction of a recording track including the recording medium shown in FIG. 1.

In FIG. 1, the magnetic head 10 has a constitution of arranging components orderly from a magnetic reading portion 11 to a magnetic writing portion 20 from the upstream (leading side). In this specification, the upstream (leading) and the downstream (trailing) have a meaning corresponding to that a recording medium 60 moves from the upstream to the downstream relative to the magnetic head 10 to conduct writing and reading. While detailed structures for the reading portion and detailed structures for the electrode take-out portion are not illustrated in FIG. 1, they are present in an actual head.

The magnetic writing portion 20 of the magnetic head shown in FIG. 1 includes a recording magnetic pole 21, magnetic exciting coils 22 for generating recording magnetic fields, a return recording magnetic pole 23, a connection portion 24 for the recording magnetic pole and the return recording magnetic pole, an electron emission source 25, and a power feed line 26, and they are prepared in the inside of an insulative buried portion 27. The electron emission source 25 is formed inside the recording magnetic pole 21.

The recording magnetic pole 21 has a recording magnetic pole surface 211 and an upstream end of the magnetic head in the direction of the recording track on the recording magnetic pole surface 211 is referred to as a leading edge.

The magnetic reading portion 11 in FIG. 1 includes a reading head 12 such as a GMR (giant magneto resistance) reading device prepared inside of the insulative buried portion 27 or a shield. The reading head may also be a TMR (tunneling magneto resistance) reading device.

The magnetic reading portion 11 and the magnetic writing portion 20 are stacked successively on a magnetic head substrate 70.

The magnetic medium 60 in FIG. 1 contains a perpendicular magnetization thin film 61 of a magnetic recording layer and a soft magnetic underlayer 62, but a substrate, a protective film, and a lubrication film are not illustrated.

Figure 3:
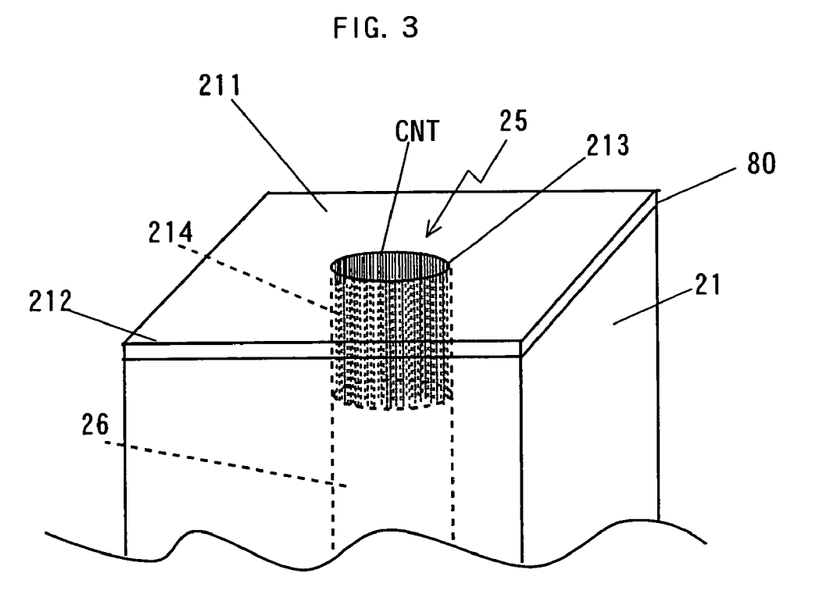
FIG. 3 is a fragmentary perspective view showing the surface of a recording magnetic pole.

FIG. 3 is a perspective view showing a magnetic surface 211 opposed to a recording medium and supplying a magnetic flux perpendicular thereto as viewed on the side of the recording medium. The electron emission source 25 is formed to the recording magnetic pole surface 211. The electron emission source 25 includes a concave portion 214 having an opening 213 open to the recording magnetic pole surface 211 and a bundle of a plurality of carbon nanotubes CNT connected with a power supply line 26 and each extending from the bottom of the concave portion 214 to the opening 213.

In the magnetic head, for substantially conforming the temperature increase region of the recording medium with the size of a recording bit, thereby enabling formation of a minute recording bit and preventing erroneous erasing of the recording bit in adjacent recording tracks, it is desirable to align the electron beam irradiation position (that is, temperature increase position) with the application position of the magnetic line of force for recording on the recording medium, more specifically to substantially align, the electron beam emission point of the bundles of the carbon nanotubes CNT with the center of the length in the recording track direction of the recording magnetic pole. Substantial alignment depends on the heat dissipation characteristic and the line speed of the recording medium and includes a range where the electron beam irradiation position is displaced from a completely aligning position by 10 to 100 nm along the relative moving direction.

The magnetic head for use in the heat-assisted magnetic recording apparatus of the embodiment includes the following constitutions (1) to (6).

(1) An electron beam emission source is disposed near the center of the recording magnetic pole surface 211 (central portion and also including a range displaced therefrom by 10 to 100 nm along the relative moving direction).

(2) The electron beam emission source is a bundle of a plurality of carbon nanotubes CNT (in a state of bundling plural tubes) oriented and grown in an indent, that is, a concave portion 214 formed to the recording magnetic pole surface from the bottom along the lateral wall surface of the indent to the opening 213. The shape of the opening 213 of the indent, that is, the range forming the carbon nanotubes is such that the width is less than the recording track width and the length is less than the length of the recording magnetic pole. The carbon nanotubes are formed directly by CVD (chemical vapor deposition) from the bottom of the indent formed by etching the surface of the recording magnetic pole such as by FIB (focused ion beam).

(3) The recording magnetic pole surface at the periphery of the indent is protected with an insulative film 80 such that the emission points of the electron beams are restricted only to the top end (free end) of a plurality of carbon nanotubes formed in the indent. This can prevent erroneous electric discharge. Actuarially, among the bundle comprising a plurality of carbon nanotubes, electron beams are emitted from a single carbon nanotube at the distance nearest to the surface of the recording medium.

(4) Since the size of the recording bit is determined depending on the area of the temperature increase region of the recording medium, the width of the recording magnetic pole is made substantially equal with or larger than the recording track width. This facilitates fabrication.

(5) The height of the carbon nanotubes is made uniform and the length is aligned with the depth of the indent. This can eliminate unevenness on the surface of the magnetic head to prevent head crush. The length of the carbon nanotubes can be made uniform by controlling the forming conditions by CVD or polishing finish after completing a slider.

(6) The drawing voltage for drawing electrons is applied by power feed supply means capable of applying a voltage between the bundle of the plurality of carbon nanotubes and the recording medium, and a power feed line is connected with the bundle of carbon nanotubes. This can simplify the structure in which an acceleration voltage for accelerating the electrons is not applied and an electron acceleration mechanism is not provided.

In this embodiment, the position for the electron beam emission point can be controlled by properly deciding the width and the length of the indent on the recording magnetic pole surface for orienting and growing a plurality of carbon nanotubes. Further, since the plurality of carbon nanotubes are oriented along the indent, the electron beam emission points scarcely shift by degradation of the carbon nanotubes. Accordingly, since the electron emission point can be positioned constantly near the center of the recording magnetic pole, the electron beam irradiation position (that is, the temperature increase position) and the application position for the magnetic line of force for recording on the magnetic recording medium can be aligned. As a result, it is possible to substantially align the temperature increase region with the size of the recording bit on the recording medium and form minute recording bits and it is possible to prevent erroneous erasing of recording bits in adjacent recording tracks.

Further, since the flows of the magnetic line of force and the electron beams from the recording magnetic pole are in parallel, and the magnetic field applied from the recording magnetic pole is so large as the magnetic fields leaked from the recording medium are negligible, the electron beams do not fluctuate by application of the magnetic fields from the recording magnetic pole, even without applying the acceleration voltage, and neither fluctuation of reading signals along the time axis (jitter) nor the meandering of recording track is caused. Accordingly, it is possible to adopt a magnetic head constitution at a reduced cost while saving the electron acceleration mechanism.

Further, since the surface of the recording magnetic pole and the top end of the plurality of carbon nanotubes as the electron beam emitting source are substantially at an aligned height, flying of the magnetic head is not interfered and it does not cause head crush even for an extremely small flying height of about 10 to 20 nm.

Further, in the steps of manufacturing the head of the invention, a step of adding a power feed line to the electron emission source, a step of forming an indent for forming carbon nanotubes near the center of the writing recording magnetic pole after cutting out the magnetic head by an FIB device (it may be formed also by resist process) and adding a catalyst such as Ni for forming the carbon nanotubes to the bottom of the indent by an FIB-CVD apparatus (for example, Ga ion beam-assisted CVD, using Ni(Co)4 as a reaction gas), and a step of orienting and growing a plurality of carbon nanotubes inside the indent also by the FIB-CVD apparatus (in addition, EB-CVD apparatus, thermal CVD apparatus, may also be used) are increased in addition to the usual steps of manufacturing thin film stacked magnetic head. However, since the steps can be completed in a single FIB apparatus, problems such as positioning for fabrication are not caused and the process is simple when compared with the method of manufacturing a magnetic head for use in heat-assisted magnetic recording as disclosed in the prior art.

According to this embodiment, the following effects (1) to (4) are obtained.
(1) Since the bundle of carbon nanotubes for the electron emission source formed by bundling several carbon nanotubes are formed inside the recording magnetic pole opposed to the recording medium substantially at the center of the recording magnetic pole surface or being displaced within a predetermined range along the relative moving direction, the energy ray irradiation position for heating the recording medium (that is, temperature increase position) and the application position for magnetic line of force for recording are substantially aligned.
(2) Since the height for the plurality of carbon nanotubes and the surface position of the recording magnetic pole are substantially aligned, additional device for the slider shape for flying stabilization is no more necessary.
(3) The temperature increase region on the recording medium can be restricted to a small size and minute recording bits can be formed. The width for the recording magnetic pole can be set substantially equal with or larger than the recording track width. Further, information bits in the adjacent recording track after recording are not erased erroneously.
(4) Since the magnetic line of force and the electron beam from the recording magnetic pole are in parallel, and the magnetic fields applied from the recording magnetic pole are large enough to neglect the magnetic fields leaked from the recording medium, even when an acceleration voltage is not applied, the electron beam does not fluctuate by the magnetic fields applied from the recording magnetic pole, and neither the fluctuation of reading signals along the time axis (jitter) nor the meandering of recording track is caused. Accordingly, it is possible to adopt a magnetic head constitution at a reduced cost while saving the electron acceleration mechanism.

Figure 4:
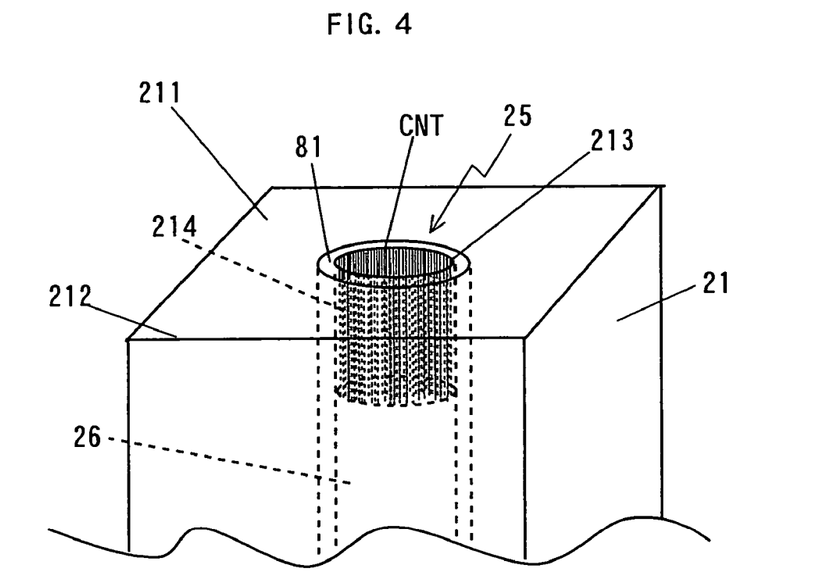
FIG. 4 is a fragmentary perspective view showing the surface of a recording magnetic pole of a magnetic head for use in heat-assisted magnetic recording apparatus as other embodiment of the invention.
Figure 5:
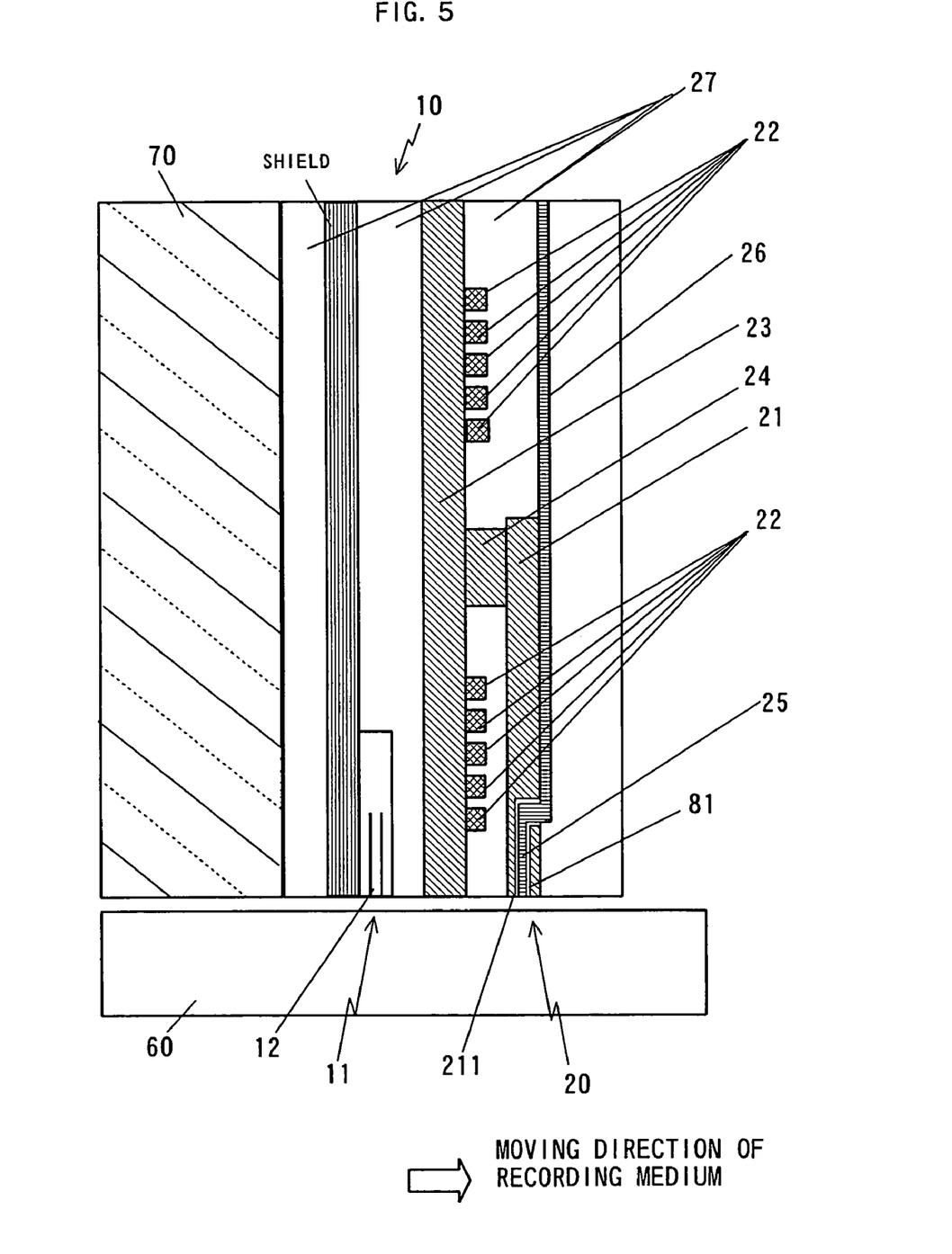
FIG. 5 is a cross sectional view showing a schematic constitution of a magnetic head for use in heat assisted magnetic recording apparatus as other embodiment of the invention.

Other example includes, as shown in FIG. 4 and FIG. 5, a magnetic head of the constitution identical with that in FIG. 3 and FIG. 2 except for providing an insulative tube 81 surrounding a portion of the power feed line 26 and the plurality of carbon nanotubes CNT as the electron beam emission source 25 to electrically insulate them from the recording magnetic pole 21 instead of the insulative film 80. This can prevent erroneous electric discharge. Since it is no more necessary to protect the recording magnetic pole surface with the insulative film, this can save the consideration for the decay of the applied magnetic fields due to the insulative film.

The magnetic head 10 having the carbon nanotubes and the recording medium 60 can be moved relatively by rotating a spindle motor mounting the recording medium, and data signals can be written and read continuously at a high speed by a predetermined tracking.

Further, referring to FIGS. 6A, 6B, 6C and 6D, description is to be made to an example of a method of orienting and growing a plurality of carbon nanotubes CNT in the concave portion 214 of the recording magnetic pole from the bottom along the lateral wall surface to the opening 213 of the indent.

Figure 6A:
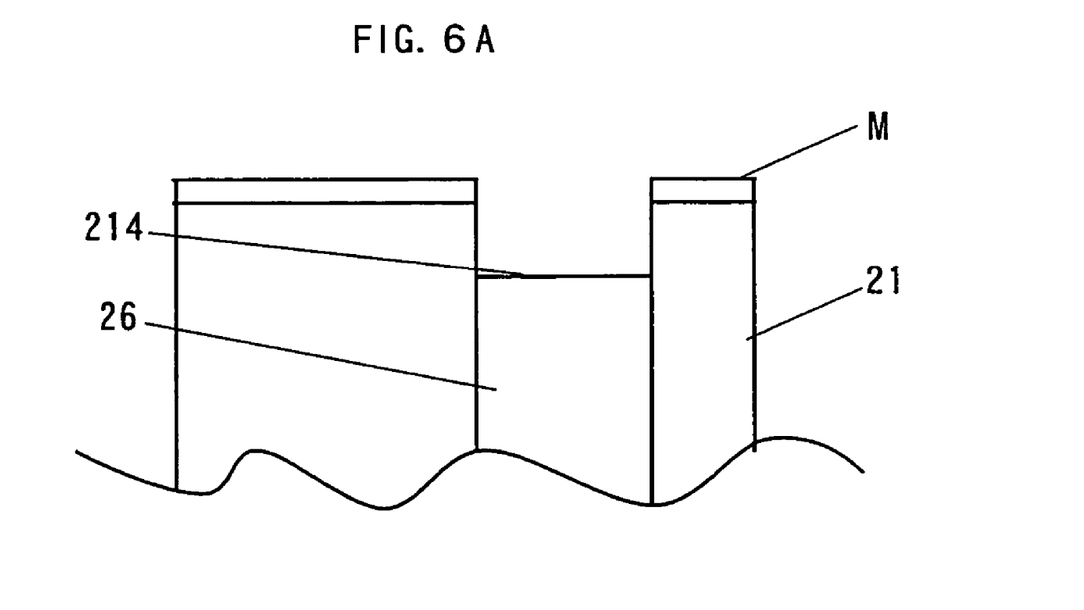
FIGS. 6A through 6D are fragmentary cross sectional views of a recording magnetic pole for explaining a method of growing carbon nanotubes.

At first as shown in FIG. 6A, a resist pattern mask M having an opening on a power feed line 26 is formed over the recording magnetic pole surface 211, and the recording magnetic pole surface 211 exposed to the resist pattern opening is etched to a predetermined depth. This forms a concave portion 214 corresponding to the carbon nanotube growing region after the etching.

Figure 6B:
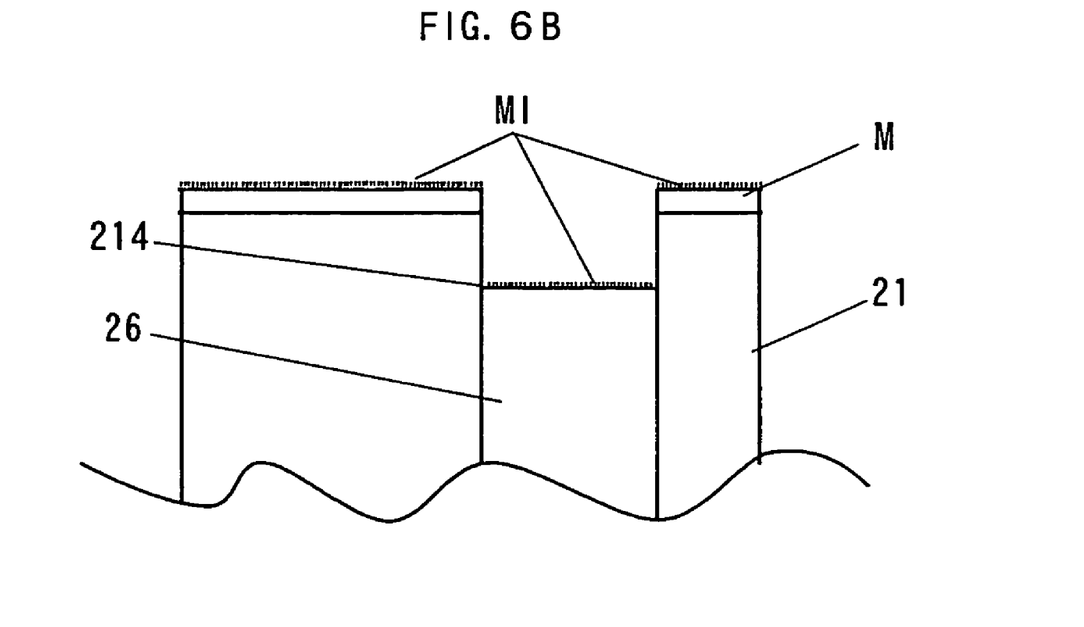

Then, as shown in FIG. 6B, a catalyst metal ion MI is deposited through the mask M and the opening thereof to the bottom of the concave portion 214 by sputtering or the like.

Figure 6C:
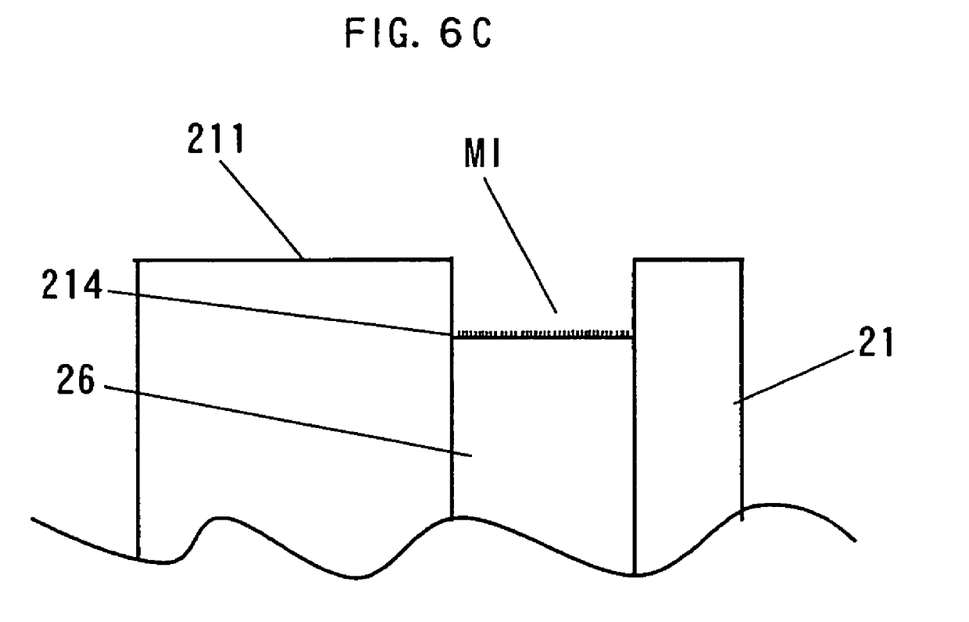

Then, after removing the mask M and applying cleaning, catalytic metal MI is left at the bottom of the concave portion 214 and those in the region other than the concave portion 214 are removed as shown in FIG. 6C.

Figure 6D:
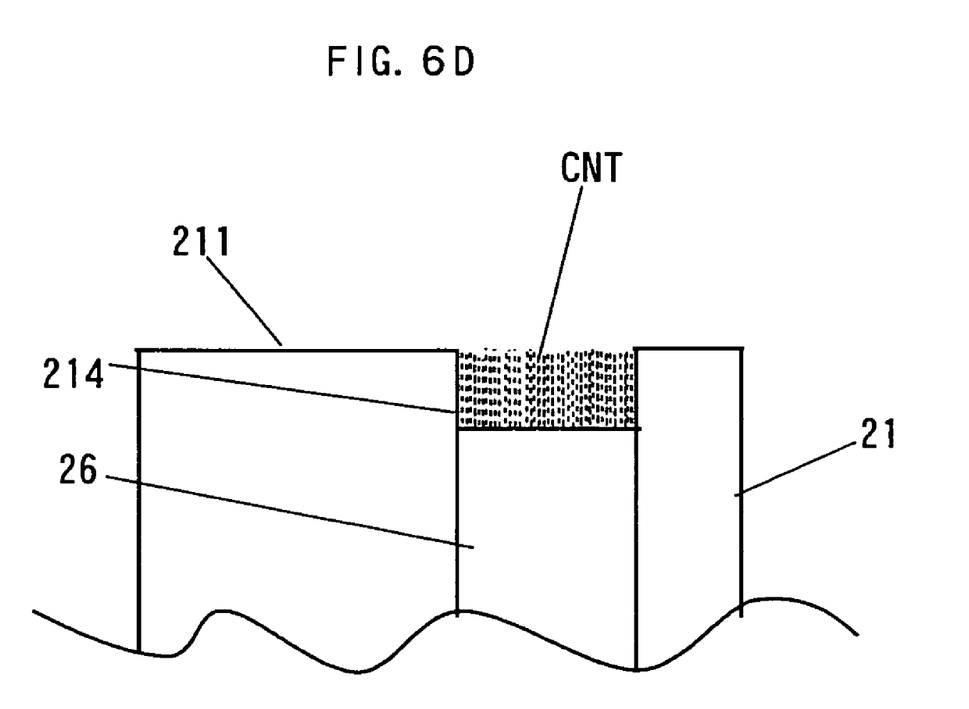

Successively, as shown in FIG. 6D, the carbon nanotubes CNT can be grown on the recording magnetic pole surface 211 by a CVD method using the catalyst metal ion MI at the bottom of the concave portion 214 as a catalyst.

Further, the catalyst metal ion can be implanted by the ion implantation method to the bottom of the concave portion 214, in addition to the deposition of the catalyst metal ions by sputtering or the like to the bottom of the concave portion 214. Further, ions can be implanted only to the bottom of the concave portion 214 by using an implantation method, for example, by using FIB, and this can save the step of removing the metal ions remaining in the mask film in the regions other than the carbon nanotube growing region.

Then, according to the polishing step for the recording magnetic pole surface 211, formation of the electron emission source is facilitated.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2005-001226 which is hereby incorporated by reference.

What is claimed is:

1. A magnetic head for use in a magnetic recording apparatus of magnetically recording information in a state of heating and elevating the temperature of a recording portion of a recording medium by emitting electrons to the recording medium, the magnetic head comprising:
   a recording magnetic pole opposed to the recording medium and having a recording magnetic pole surface for supplying a magnetic flux to the recording medium; and
   an electron emission source formed to the recording magnetic pole, wherein the electron emission source includes:
   a concave portion having an opening having a width and formed to the recording magnetic pole having length and open to the recording magnetic pole surface; and
   a bundle of a plurality of carbon nanotubes having length extending from the bottom to the opening of the concave portion, wherein the length of the carbon nanotubes is less than the length of the recording magnetic pole, and
   wherein said width of said opening is less than a recording track width.

2. The magnetic head for use in a magnetic recording apparatus according to claim 1, wherein the electron emission source is disposed at the center or being displaced from the center by 10 to 100 nm for the traverse surface of the supplied magnetic flux.

3. The magnetic head for use in a magnetic recording apparatus according to claim 1, wherein the magnetic head has an insulative film formed to the recording magnetic pole surface at the periphery of the opening and/or surrounding the bundle of the carbon nanotubes.

4. The magnetic head for use in a magnetic recording apparatus according to claim 1, wherein the magnetic head has a power feed line connected with the bundle of the carbon nanotubes.

5. The magnetic head for use in a magnetic recording apparatus according to any one of claims 1 to 4, wherein the free ends of the plurality of carbon nanotubes are situated at the portion for the opening.

6. The magnetic head for use in a magnetic recording apparatus according to claim 1, wherein the free end of any one of the carbon nanotubes nearer to the recording medium has an electron emission point.

7. The magnetic head for use in a magnetic recording apparatus according to claim 1, wherein the recording magnetic pole has a width equal to or larger than the recording track width.

* * * * *